US005822690A

United States Patent [19]

Rynk et al.

[11] Patent Number: 5,822,690

[45] Date of Patent: Oct. 13, 1998

[54] MULTI-POLE SWITCH ASSEMBLY PROVIDING DISPLAY COVER AND VIRTUAL PIVOT ACTION

[75] Inventors: Evan F. Rynk, Boca Raton; Charles Alan Actor, Boynton Beach; Lawrence E. Davis, West Palm Beach, all of Fla.

[73] Assignee: Motorola, Inc., Schaumburg, Ill.

[21] Appl. No.: 630,702

[22] Filed: Apr. 12, 1996

[51] Int. Cl.[6] ........ H04B 1/08

[52] U.S. Cl. ........ 455/351; 455/38.4; 455/90; 340/825.44; 200/5 A; 200/313

[58] Field of Search ........ 455/38.1, 38.2, 455/38.3, 38.4, 380.5, 575, 90, 128, 347, 344, 348, 351; 340/825.44; 200/5 R, 5 A, 18, 313, 314, 315, 343, 517

[56] References Cited

U.S. PATENT DOCUMENTS

| | | | |
|---|---|---|---|
| 4,256,931 | 3/1981 | Palisek | 200/5 A |
| 4,520,240 | 5/1985 | Swindler | 200/5 R |
| 4,613,736 | 9/1986 | Shichijo et al. | 200/5 A X |
| 4,704,740 | 11/1987 | McKee et al. | 455/348 |
| 5,087,798 | 2/1992 | Rohde et al. | 200/5 A |
| 5,507,038 | 4/1996 | Cook et al. | 455/38.4 X |
| 5,508,479 | 4/1996 | Schooley | 200/5 R |

OTHER PUBLICATIONS

Brad Murray, *Combination LCD and Switch Actuator*, Motorola, Inc., Technical Developments, vol. 14, Dec. 1991.

*Primary Examiner*—Edward F. Urban
*Assistant Examiner*—Philip J. Sobutka
*Attorney, Agent, or Firm*—Philip P. Macnak

[57] ABSTRACT

A multi-pole switch assembly (100, 400) includes a housing (102, 402) having an opening (122) and includes a supporting substrate (116) positioned opposite the opening (122). A first switch (112), a second switch (112), and an elastomeric support (104) are positioned on the supporting substrate (116). An actuator (108) is supported by the elastomeric support (104) and includes a first latching element (126) and a second latching element (126) which secure the actuator (108) to the supporting substrate (116) within the opening (122). The first latching element (126) and the second latching element (126) enable motion of the actuator (108) in a direction substantially normal to the supporting substrate (116) for actuating the first switch (112) and the second switch (112), respectively. The latching element opposite the switch being actuated engages the supporting substrate (116), while the portion of the elastomeric support (104) proximate the latching element provides a virtual pivot which enables actuation of the switch.

23 Claims, 5 Drawing Sheets

MULTI-POLE SWITCH ASSEMBLY PROVIDING DISPLAY COVER AND VIRTUAL PIVOT ACTION

FIELD OF THE INVENTION

This invention relates in general to switches, and more specifically to a multi-pole switch assembly which can be incorporated with a display lens.

DESCRIPTION OF THE PRIOR ART

Switches are widely used to provide control of numerous electronic devices. One such electronic device is a selective call receiver, or pager, in which switches are utilized to provide control of various receiver functions, such as resetting an alert, recalling or deleting a message stored in memory, and so forth. As the complexity of the electronic devices is increased, there is often a need for an increased number of switches, or an increase in the functionality of the switches which are available. Over the years, the complexity of selective call receivers has increased dramatically, which has resulted in an increase in the number of switches that are typically required to provide control of the operation of the receivers. At the same time that the complexity of the selective call receivers has increased, there has been significant reductions in the size of the selective call receiver package. One solution to the reduction in size of the receiver package has been to reduce the size of the buttons actuating the switches. However, as the size of the buttons are reduced, operation of the switches become more difficult, especially by persons having large fingers or who often wear gloves. A further problem is that smaller and smaller switches are required as the circuit board real estate is reduced. A still further problem is that as the size of the receiver package has been reduced, there has been a need for larger and larger displays for displaying the information received by the selective call receivers. Thus, not only is the circuit board real estate limited, but also the housing real estate is further reduced due to the larger displays, making it considerably more difficult to satisfactorily locate the switches for operation of the receiver.

One solution to the problem of adding switches and switching functions has been to utilize "rocker" style switches. Such "rocker" style switches have generally utilized a centrally located pivot which has influenced the size of the switch for proper operation and has limited the locating of components under the switch. Several other solutions which have been proposed is to utilize the LCD assembly as the actuator of the switches. These prior art switching arrangements have required contact with the LCD, directly or indirectly, which often led to breakage of the LCD display, either by overflexing the LCD display when used as actuator, or through a sudden shock or impact to the LCD assembly.

Thus what is needed is a multi-pole switch assembly which minimizes the circuit board real estate required for use. What is also needed is a multi-pole switch assembly which does not require a reduction in the size of the button, or actuator surface, used to operate the switches. What is also needed is a multi-pole switch assembly which can be readily customized to any number of switches. What is also needed is a multi-pole switch assembly which can also be utilized in conjunction with a display, and which requires no additional housing real estate for locating of the switches. And what is also needed is a multi-pole switch assembly which when utilized with a display, provides protection to the display through sudden impact or shock.

DESCRIPTION OF THE PREFERRED EMBODIMENTS

Figure 1:
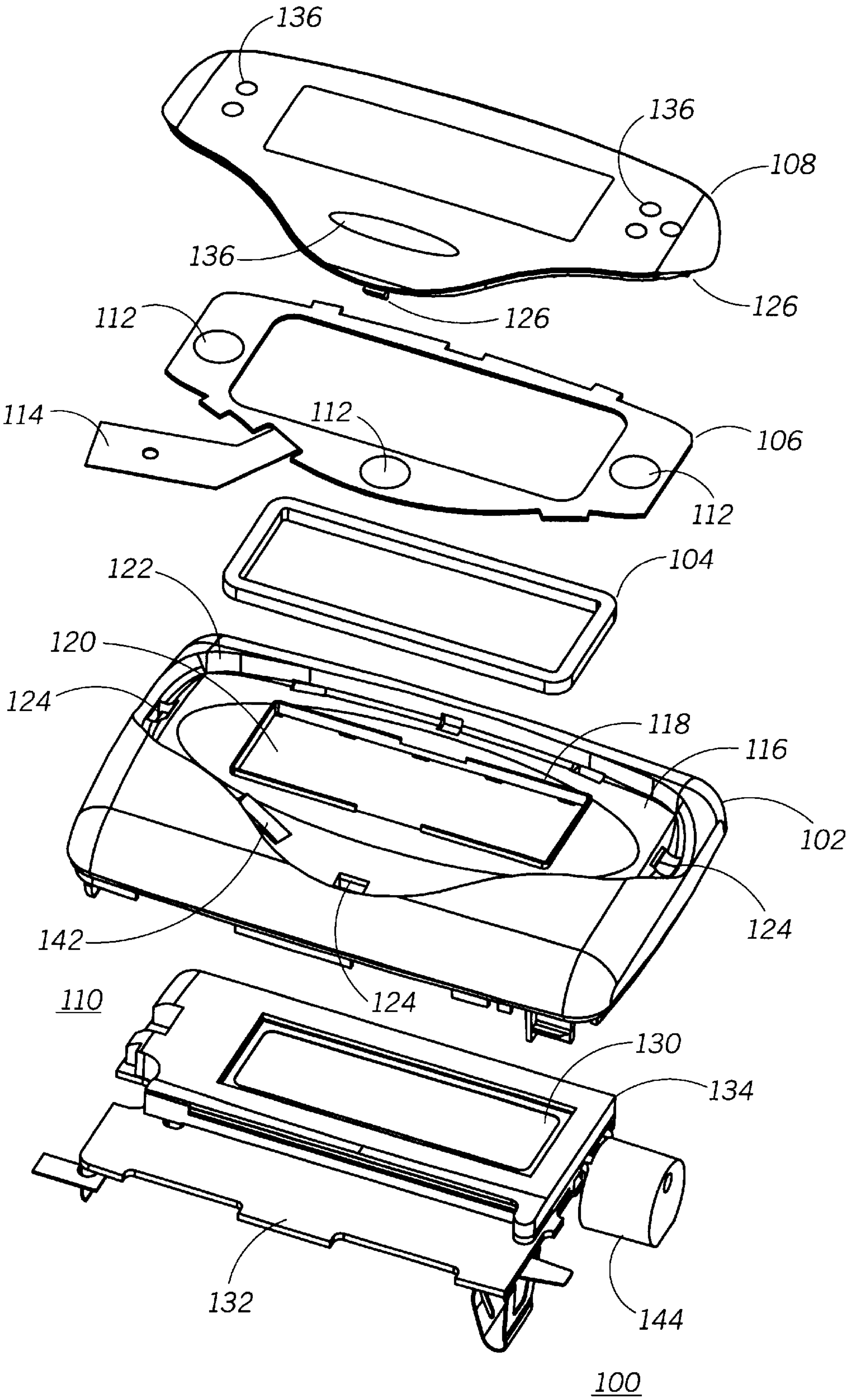
FIG. 1 is an exploded view of a multi-pole switch assembly in accordance with a first embodiment of the present invention.

FIG. 1 is an exploded view of a multi-pole switch assembly 100 in accordance with a first embodiment of the present invention. The multi-pole switch assembly 100 is embodied in a housing 102 which is part of an electronic device, which by way of example is the housing for a selective call receiver which utilizes a display 130, such as an LCD display, for displaying messages which have been received. The housing 102 is formed using conventional injection molding techniques using a material such as a polycarbonate plastic (Lexan®). The housing 102 has an opening 122 into which an actuator 108 in the form of a display lens is assembled as will be described in detail below. The housing 102 also includes a supporting substrate 116, which by way of example is molded as a part of the housing 102, and which is positioned opposite the opening 122 to form a recess within the housing 102.

As shown in FIG. 1, the supporting substrate 116 includes an aperture 120 through which the display 130 can be viewed. In the present invention, the aperture 120 is bounded by a rim 118 which is used to locate an elastomeric support 104, which by way of example is formed from a urethane foam pad (Poron™), and a switch matrix 106 includes a number of switches 112 which are referred to as poly-dome switches, such as manufactured by PMC (Singapore) PTE LTD, Republic of Singapore. The poly-dome switches are electrically accessed via a flat cable 114 which is passed into the interior of the housing 102 through a molded slot 142 in the supporting substrate 116. The urethane foam pad preferably includes a double side adhesive which is used to attach the elastomeric support 104 to the supporting substrate 116 and to actuator 108. The elastomeric pad performs several functions: to allow the display lens to float independent of the housing 102 which reduces impact damage to the lens by allowing the lens to move during impact; to dissipate impact forces during drop which has the effect of shielding the interior components, such as the LCD display; to provide an environmental seal protecting the LCD display from dust, moisture, and other contaminants; and to function as a virtual pivot during the actuation of the poly-dome switches, as will be described in detail below. The actuator 108 generally includes at least two latches 126 which function as latching elements to engage with at least two slots 124 formed in the supporting substrate 116. The actuator 108 is preferably molded using conventional molding techniques from an acrylic plastic material which is highly impact resistant and scratch resistant, and is in-mold decorated to provide only a window for viewing the display 130. The actuator 108 also includes indicia 136 molded into portions of the top surface of the actuator 108 which identifies the location of the switches 112 such as shown in FIG. 1, although it will be appreciated that the indicia 136 can also be screen printed onto the actuator 108, or molded into or screen printed on the housing as well.

Unlike the prior art display assemblies described above, the display assembly 110, in accordance with the present invention, is isolated from the switch matrix 106 and the actuator 108. The display assembly 110 includes the display 130, a bezel which is enclosed within a gasket 134, and a circuit board 132 as shown and described in greater detail FIG. 2 which is described below. The gasket 134 is formed from an elastomeric material, such as butyl rubber, and engages the lower surface of the supporting substrate 116 to provide additional shock protection to the display 130. Also shown in FIG. 1 is a transducer 144, the function of which will be described in further detail below.

It will be appreciated that the supporting substrate 116 described above need not be formed as a part of the housing. The supporting substrate can also be a separate printed circuit board which can be enclosed within the housing 102. When a printed circuit board is utilized, it will also be appreciated that other types of switches can be utilized, such as discrete mechanical switches, popple switches and carbon filled elastomeric switches which are actuated using the actuator 108 described above in accordance with the present invention.

Figure 2:
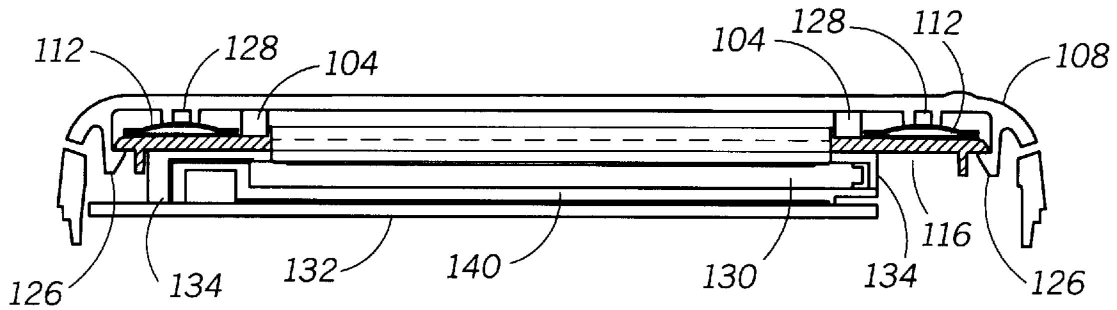
FIG. 2 is a cross-sectional view of the multi-pole switch assembly of FIG. 1.

FIG. 2 is a cross-sectional view of the multi-pole switch assembly 100 of FIG. 1. As shown in FIG. 2, the orientation of the elastomeric support 104 and the switches 112 to the actuator 108 and the supporting substrate 116 are shown. As shown, after the elastomeric support 104 and the switch matrix 106 are positioned onto the top surface of the supporting substrate 116, the display lens can be snapped into place with the latches 126 engaging the supporting substrate 116. The latches 126 allow the actuator 108 to float, as will be described in further detail below. The actuator 108 also includes bosses 128 which engage the switches 112, causing the switches 112 to be actuated when the actuator 108 is depressed. As also shown, the display assembly 110, which is preferably positioned against the bottom surface of the supporting substrate 116, includes the display 130, a printed circuit board 132, the gasket 134, and a light wedge 140.

Figure 3:
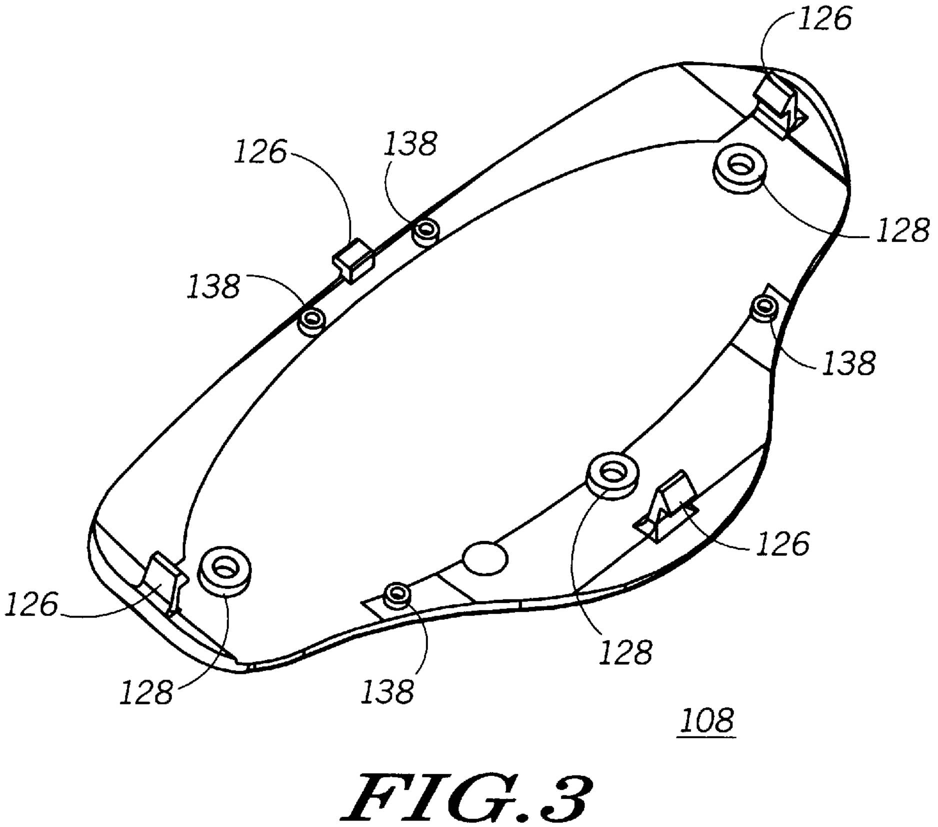
FIG. 3 is a bottom plan view of the actuator lens of the multi-pole switch assembly of FIG. 1.

FIG. 3 is a bottom plan view of the actuator 108 of the multi-pole switch assembly of FIG. 1. The actuator 108 includes an number of latches 126, four of which are shown by way of examples, position adjacent to a number of bosses 128, four of which are shown by way of example, which are used to actuate the switches 112, as described above. Also shown are four additional bosses 138, four of which are shown by way of example, 10 and which are shorter than the bosses 128. The bosses 128 and additional bosses 138 are formed as hollow cylinders which allow very uniform molding of the height of the bosses. The additional bosses 138 prevent the simultaneous actuation of adjacently positioned switches 112 when the display lens is depressed in the area between the switches.

Figure 4:
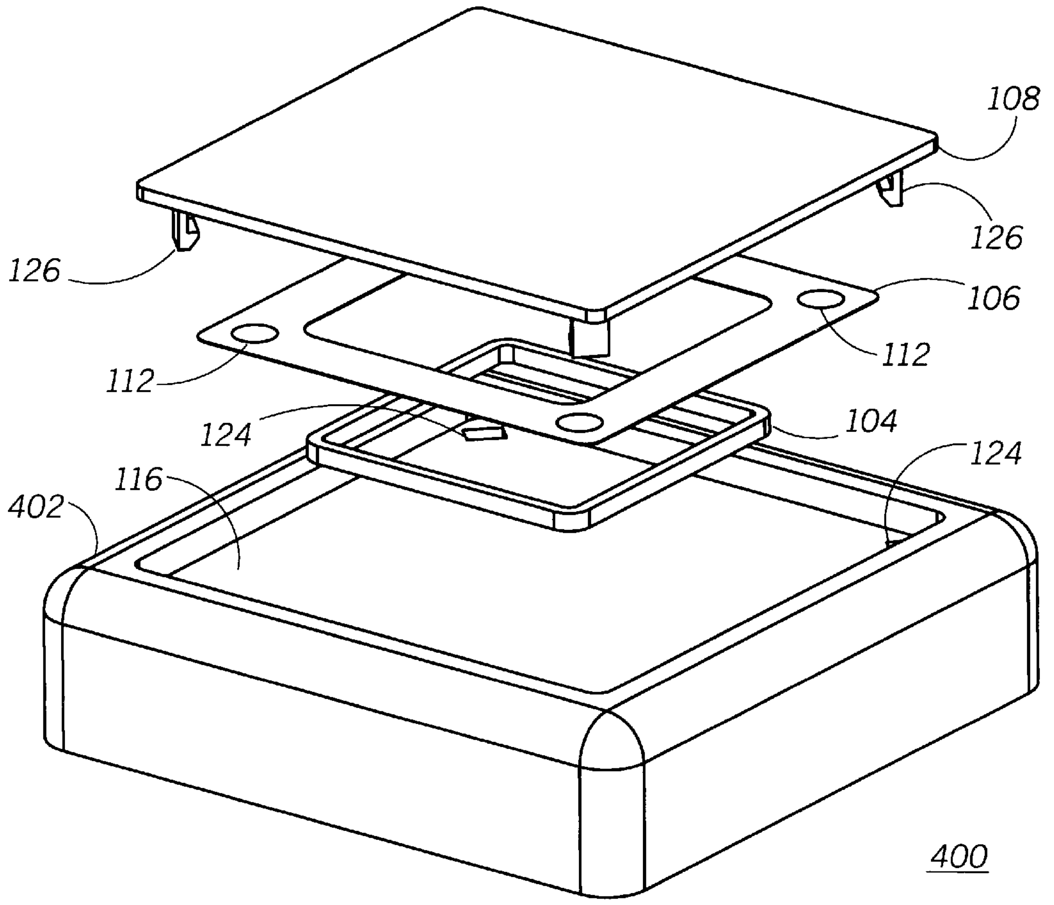
FIG. 4 is an exploded view of a multi-pole switch assembly in accordance with a second embodiment of the present invention.

FIG. 4 is an exploded view of a multi-pole switch assembly 400 in accordance with a second embodiment of the present invention. The multi-pole switch assembly 400 includes a housing 402 having an opening, and includes within the opening a supporting substrate 116 positioned opposite the opening to form a recess within the housing 402. A switch matrix 106 which provides four switches, three of which are shown, is positioned on the supporting substrate 116. An elastomeric support 104 is positioned on and coupled to the supporting substrate, and as can been seen is positioned substantially between each of the switches. An actuator is next placed within the opening and is supported by the elastomeric support 104 and is latched in place by latches 126 which engage with slots 124 in the supporting substrate, thereby securing the actuator to the supporting substrate within the opening. The housing 402 can be molded as a housing or as a bezel and can include the supporting substrate 116 as being molded as a part of the housing, or as a printed circuit board to which the bezel is attached.

Figure 5:
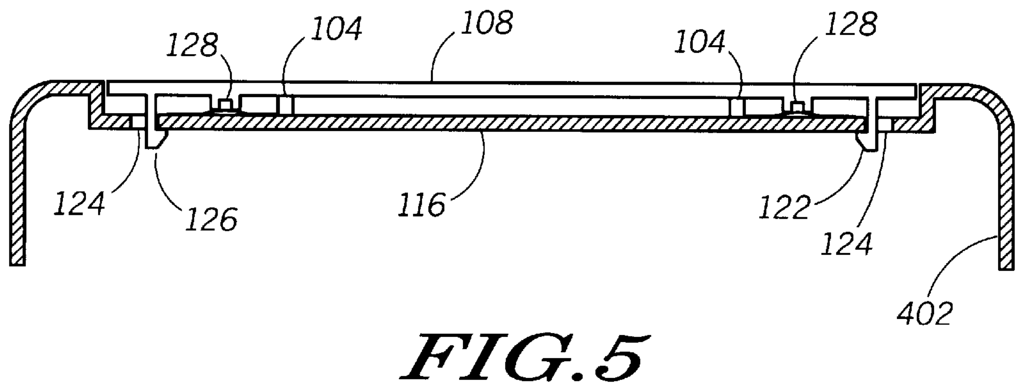
FIG. 5 is a cross-sectional view of the multi-pole switch assembly of FIG. 4.

FIG. 5 is a cross-sectional view of the multi-pole switch assembly 400 of FIG. 4 in accordance with the present invention. As shown in FIG. 4, the orientation of the elastomeric support 104 and the switches 112 to the actuator 108 and the supporting substrate 116 are clearly shown. As shown, once the elastomeric support 104 and the switch matrix 106 are position on the supporting substrate 116, the actuator 108 can be snapped into place with the latches 126 engaging the supporting substrate 116 through the slots 124, which allows the actuator 108 to float, as will be described in further detail below. The actuator 108 includes bosses 128 which engage with the switches 112, causing the switches 112 to be actuated when the actuator 108 is depressed, as described above.

Figure 6:
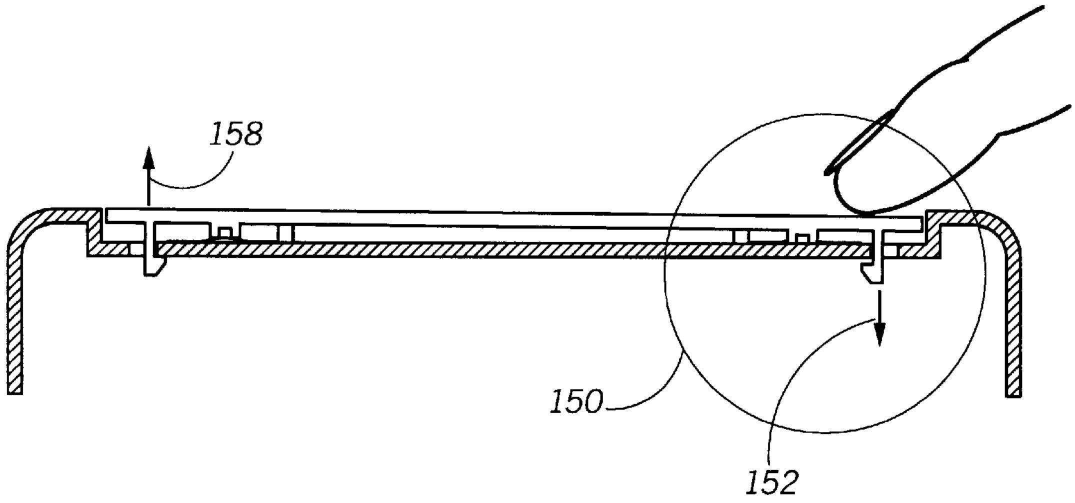
FIG. 6 is a cross-sectional view of the multi-pole switch assembly of FIG. 4 illustrating switch actuation.
Figure 7:
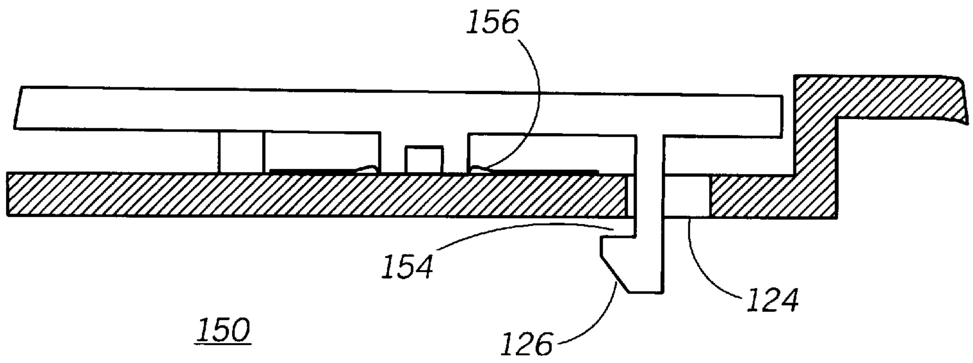
FIG. 7 is an enlarged cross-sectional view of FIG. 6 illustrating actuation of a switch in accordance with the present invention.

FIG. 6 is a cross-sectional view and FIG. 7 is an enlarged cross-sectional view 150 of the multi-pole switch assembly 100 and 400 of FIGS. 2 and 4, respectively, illustrating switch actuation. As shown in FIGS. 6 and 7, when the actuator 108 is depressed, the latch 126 which captivates actuator 108 to the supporting substrate 116, enables that portion of the actuator 108 to move a distance 154 relative to the housing 102, 402 and supporting substrate 116, respectively, in a direction 152 substantially normal to the supporting substrate 116, causing the elastomeric support 104 to be compressed sufficiently in the region where the actuator 108 is depressed to cause actuation of the switch 156. The elastomeric support 104 and the latch 126 opposite the switch 112 being actuated provides a virtual pivot which determines the location about which the actuator 108 pivots, and consequently allows the switch 112 to be actuated over fairly wide region of the actuator 108, thereby allowing actuation of the switches by persons having large fingers or using gloves. Unlike the prior art switches described above, the virtual pivot provided by the elastomeric support 104 in conjunction with the latch 126 located opposite the switch 112 which is being actuated prevents the actuator 108 from moving in a direction 158 above the surface of the housing 402. This minimizes the intrusion of dust into the space below the actuator 108, further improving the environmental seal provided by the elastomeric support 104 when the actuator 108 is a display lens as described in FIG. 1 above. In addition to providing individual actuation of a switch as described above by the actuator 108, since the actuator 108 floats on the elastomeric support 104, multiple switches can also be simultaneously actuated if desired, unlike a conventional switch which provides a fixed central pivot about which the actuator operates. By positioning the additional bosses on the actuator between those bosses which are used to actuate the switches, multiple actuation of adjacent switches can be prevented when the actuator 108 is depressed in an area substantially between the adjacent switches, and also prevents inadvertent actuation of an adjacent switch when a desired switch is actuated.

As shown in FIGS. 4 and 5, the elastomeric support 104 is positioned inside the area bounded by the switches 112. It will be appreciated that the elastomeric support 104 can also be positioned outside the area bounded by the switches 112 and inside the area bounded by the latches 126, or positioned outside the area bounded by the latches 126 while maintaining the operation of the switches as described above. When the elastomeric support is positioned outside the area bounded by the latches 126, the elastomeric support 104 can also function as a gasket to prevent contamination, such as dust and dirt, from getting under the actuator 108

Figure 8:
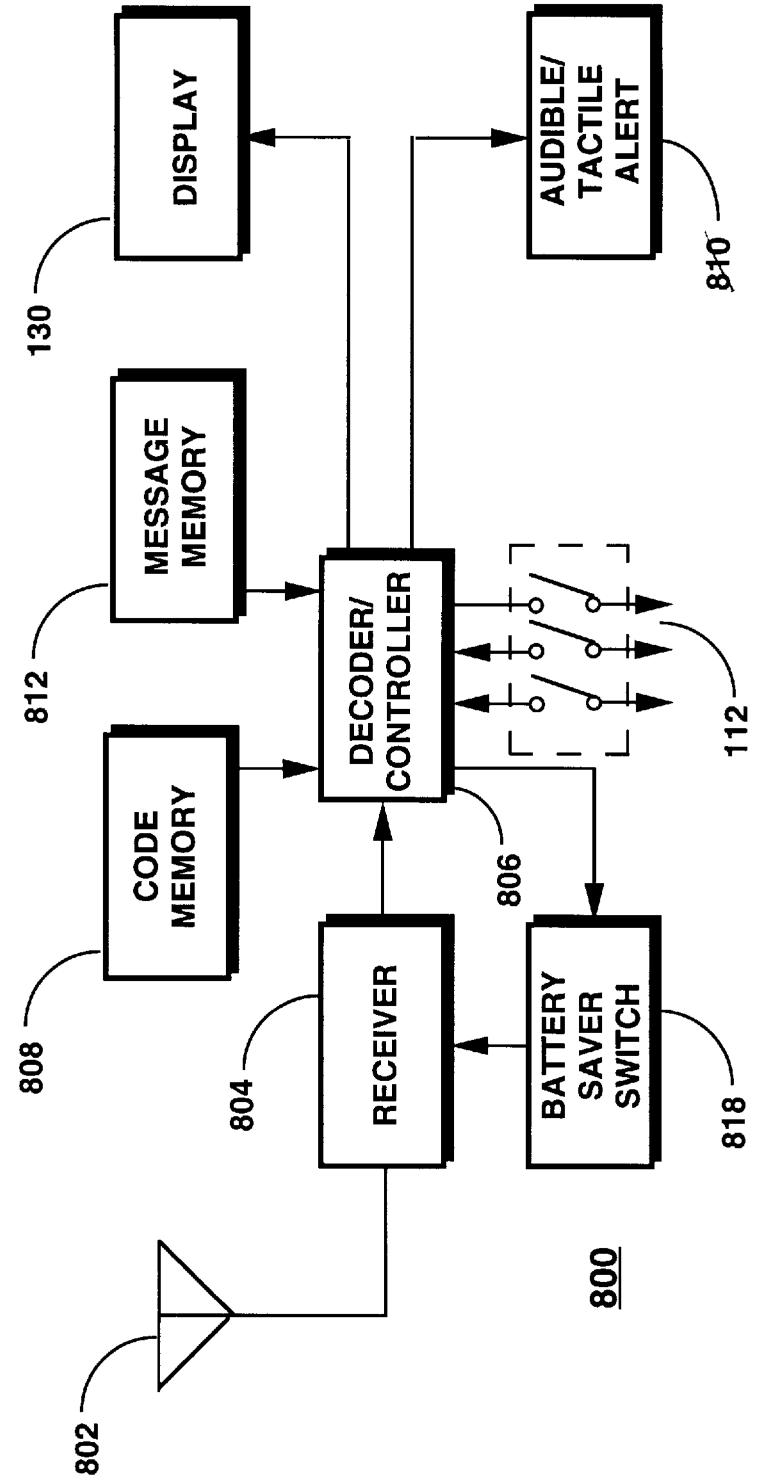
FIG. 8 is an electrical block diagram of a selective call receiver utilizing the multi-pole switch assembly of FIG. 1

FIG. 8 is an electrical block diagram of a selective call receiver 800 utilizing the multi-pole switch assembly 100 of FIG. 1 in accordance with the preferred embodiment of the present invention. Radio frequency signals are intercepted by an antenna 802 which is coupled to the input of a receiver 804 which processes the intercepted radio frequency signals, in a manner well known to one of ordinary skill in the art. In practice, the intercepted signals, which represent a selective call message, include address signals identifying the selective call receiver 800 to which message signals are intended. The received address signals are coupled to the input of a decoder/controller 806 which compares the received address signals with a predetermined address which is stored within the code memory 808. When the received address signals match the predetermined address stored, the message signals are received, and the message is stored in a message memory 812. The decoder/controller 806 also generates an alert enable signal which is coupled to an audible/tactile alerting device 810, such as the transducer 144 of FIG. 1 which generates an audible alert, or a vibrator which generates a tactile alert indicating that a message has been received. The audible/tactile alert is reset by the selective call receiver user and the message is recalled from the message memory 812 for presentation of the selective call message on the display 130 using the switches 112 which are actuated via the display lens and which provide a variety of user input functions which are well known to one of ordinary skill in the art. The message recalled from the message memory 812 is directed via the decoder/controller 806 to a display 130, such as an LCD display, which is visible through the display lens and where the message is displayed for review by the selective call receiver user.

In summary, a multi-pole switch assembly has been described above which minimizes the circuit board real estate required for use and provides considerable flexibility in locating the switches. The multi-pole switches can be readily incorporated within a housing, thereby eliminating the need to mount any switches on the printed circuit board, and do not require the use of any tools to assemble and locate multiple switches on a housing. The multi-pole switch assembly described above does not require a reduction in the size of the button, or actuator surface, used to operate the switches, and in fact provides great flexibility in the shape of the actuator that can be provided for actuating multiple switches. The multipole switch assembly described above can be readily customized to any number of switches. While a three position switch and a four position switch were described above, it will be appreciated by one of ordinary skill in the art that the present invention can be extended to include a two-pole switch, a five-pole switch, or an N-pole switch. The multi-pole switch assembly described above can be utilized in conjunction with a display, and which requires no additional housing real estate for locating of the switches, and when utilized with a display provides added protection due to sudden impact or shock to the display, thereby significantly reducing the occurrence of fractures that often occur in LCD displays on electronic devices.

We claim:

1. A selective call receiver comprising:

a receiver for receiving a selective call message directed to the selective call receiver;

a decoder, responsive to said receiver, for decoding the selective call message;

an alerting device, responsive to said decoder, for generating an alert when the selective call message is received;

a housing having an opening and including within a supporting substrate positioned opposite said opening, said supporting substrate supporting a display for displaying the selective call message which is received and decoded, the selective call message being viewable through said opening; and a switch assembly comprising a first switch and a second switch, positioned on said supporting substrate, for controlling at least said alerting device and a presentation of the selective call message on said display, an elastomeric support, positioned within said opening, and attached to said supporting substrate and substantially surrounding said display, said elastomeric support being positioned substantially between said first switch and said second switch, and a lens for viewing said display, said lens being supported by said elastomeric support and including a first latching element and a second latching element which engage said supporting substrate and secure said lens to said supporting substrate within said opening, said first latching element enabling motion of a first portion of said lens in a direction substantially normal to said supporting substrate for actuating said first switch, and said second latching element enabling motion of a second portion of said lens in a direction substantially normal to said supporting substrate for actuating said second switch, and wherein said first latching element when engaged with said supporting substrate and said lens is supported by a portion of said elastomeric support proximate to said first latching element and provides a virtual pivot for enabling actuation of said second switch by said lens, and further wherein said second latching element when engaged with said supporting substrate and said lens is supported by a portion of said elastomeric support proximate to said second latching element and provides a virtual pivot for enabling actuation of said first switch by said lens.

2. A multi-pole switch assembly, comprising:

a housing having an opening, and including therein a supporting substrate positioned opposite said opening;

an elastomeric support, positioned within said opening, and attached to said supporting substrate;

a first switch and a second switch positioned on said supporting substrate proximate to said elastomeric support; and an actuator, supported by said elastomeric support and including a first latching element and a second latching element which engage said supporting substrate and secure said actuator to said supporting substrate within said opening, said first latching element enabling motion of said actuator in a direction substantially normal to said supporting substrate for actuating said first switch, and said second latching element enabling motion of said actuator in a direction substantially normal to said supporting substrate for actuating said second switch, and wherein said first latching element when engaged with said supporting substrate and said actuator is supported by a portion of said elastomeric support proximate to said first latching element and provides a first virtual pivot for enabling actuation of said second switch by said actuator, and further wherein said second latching element when engaged with said supporting substrate and said actuator is supported by a portion of said elastomeric support proximate to said second latching element and provides a second virtual pivot for enabling actuation of said first switch by said actuator.

3. The multi-pole switch assembly according to claim 2, wherein said first switch is positioned adjacent to said first latching element and said second switch is positioned adjacent to said second latching element.

4. The multi-pole switch assembly according to claim 1, wherein said virtual pivot enables an individual actuation of said first switch and said second switch by said actuator.

5. The multi-pole switch assembly according to claim 1, wherein said virtual pivot enables a simultaneous actuation of said first switch and said second switch by said actuator.

6. The multi-pole switch assembly according to claim 1, wherein said actuator comprises a first boss and a second boss, and wherein said first boss is positioned adjacent to said first switch for providing actuation of said first switch when said actuator is depressed, and wherein said second boss is positioned adjacent to said second switch for providing actuation of said second switch when said actuator is depressed.

7. The multi-pole switch assembly according to claim 2, wherein said actuator further comprises at least one additional boss positioned substantially between said first switch and said second switch for preventing a simultaneous actuation of said first switch and said second switch when said actuator is depressed at a position between said first switch and said second switch.

8. The multi-pole switch assembly according to claim 1, wherein said elastomeric support is a rectangular gasket.

9. The multi-pole switch assembly according to claim 1, wherein said supporting substrate forms a recess in said housing.

10. A multi-pole switch assembly, comprising:

a housing having an opening and including therein a supporting substrate positioned opposite said opening;

a display coupled to said supporting substrate and viewable through said opening within said housing;

an elastomeric support, positioned within said opening, and attached to said supporting substrate and substantially surrounding said display;

a first switch and a second switch positioned on said supporting substrate proximate to said elastomeric support; and a lens for viewing said display, said lens being supported by said elastomeric support and including a first latching element and a second latching element which engage said supporting substrate and secure said lens to said supporting substrate within said opening, said first latching element enabling motion of a first portion of said lens in a direction substantially normal to said supporting substrate for actuating said first switch, and said second latching element enabling motion of a second portion of said lens in a direction substantially normal to said supporting substrate for actuating said second switch, and wherein said first latching element when engaged with said supporting substrate and said lens is supported by a portion of said elastomeric support proximate to said first latching element and provides a virtual pivot for enabling actuation of said second switch by said lens, and further wherein said second latching element when engaged with said supporting substrate and said lens is supported by a portion of said elastomeric support proximate to said second latching element and provides a virtual pivot for enabling actuation of said first switch by said lens.

11. The multi-pole switch assembly according to claim 10, wherein said supporting substrate forms a recess in said housing.

12. The multi-pole switch assembly according to claim 10, wherein said supporting substrate has a first surface facing said opening and a second surface and an aperture formed therein for enabling viewing of said display.

13. The multi-pole switch assembly according to claim 12, wherein said display is coupled to said second surface of said supporting substrate and is viewable through said aperture.

14. The multi-pole switch assembly according to claim 12, wherein said elastomeric support is coupled to said first surface of said supporting substrate.

15. The multi-pole switch assembly according to claim 10, wherein said first switch is positioned adjacent to said first latching element and said second switch is positioned adjacent to said second latching element.

16. The multi-pole switch assembly according to claim 10, wherein said virtual pivot enables an individual actuation of said first switch and said second switch by said first portion and said second portion of said lens.

17. The multi-pole switch assembly according to claim 10, wherein said virtual pivot enables a simultaneous actuation of said first switch and said second switch by said first portion and said second portion of said lens.

18. The multi-pole switch assembly according to claim 10, wherein said lens comprises a first boss and a second boss, and wherein said first boss is positioned adjacent to said first switch for providing actuation of said first switch when said first portion of said lens is depressed, and wherein said second boss is positioned adjacent to said second switch for providing actuation of said second switch when said second portion of said lens is depressed.

19. The multi-pole switch assembly according to claim 10, wherein said lens further comprises at least one additional boss positioned between said first switch and said second switch for preventing a simultaneous actuation of said first switch and said second switch when said lens is depressed at a position between said first switch and said second switch.

20. The multi-pole switch assembly according to claim 10, wherein said lens is moveable within said opening.

21. The multi-pole switch assembly according to claim 10, wherein said elastomeric support provides an environmental seal for said display.

22. The multi-pole switch assembly according to claim 10, wherein said elastomeric support provides shock protection to said display.

23. The multi-pole switch assembly according to claim 10, wherein said elastomeric support is a rectangular gasket.

* * * * *